United States Patent
Leising et al.

(10) Patent No.: US 9,279,461 B2
(45) Date of Patent: Mar. 8, 2016

(54) INTEGRATED MEMORY CHIP FOR A COUPLING DEVICE

(75) Inventors: Brian E. Leising, Central, SC (US);
Phillip Wood, Lake Orion, MI (US);
Ryan M. True, Clawson, MI (US)

(73) Assignee: BorgWarner Inc., Auburn Hills, MI (US)

( * ) Notice: Subject to any disclaimer, the term of this patent is extended or adjusted under 35 U.S.C. 154(b) by 37 days.

(21) Appl. No.: 12/940,659

(22) Filed: Nov. 5, 2010

(65) Prior Publication Data

US 2012/0116638 A1      May 10, 2012

Related U.S. Application Data

(63) Continuation of application No. PCT/US2009/042822, filed on May 5, 2009.

(60) Provisional application No. 61/052,843, filed on May 13, 2008.

(51) Int. Cl.
*B60W 10/02* (2006.01)
*F16D 27/00* (2006.01)
(Continued)

(52) U.S. Cl.
CPC ............ *F16D 27/115* (2013.01); *B60W 10/02* (2013.01); *F16D 27/14* (2013.01); *F16D 48/064* (2013.01); *G01M 13/02* (2013.01); *B60W 10/10* (2013.01);
(Continued)

(58) Field of Classification Search
USPC .............. 74/335, 337.5, 339; 137/599.07; 192/35, 84.1, 84.6; 303/119.5; 359/15; 475/116, 128, 225; 477/3, 34, 44, 129, 477/5, 107, 117, 156, 176, 180, 249, 174; 701/48, 51, 55, 67, 68, 97; 700/94, 264
See application file for complete search history.

(56) References Cited

U.S. PATENT DOCUMENTS 5,377,111 A * 12/1994 Takahashi et al. .............. 701/59
5,839,328 A   11/1998 Showalter
(Continued)

FOREIGN PATENT DOCUMENTS

JP          2007177979 A      7/2007

OTHER PUBLICATIONS

Dictionary.com definitions for the words "portable," temporary, and "secure."*

(Continued)

*Primary Examiner* — Fadey Jabr
*Assistant Examiner* — Kevin P Mahne
(74) *Attorney, Agent, or Firm* — BrooksGroup (57) ABSTRACT

A coupling device system for use in a motor vehicle is provided including a coupling device and a memory chip. The coupling device has an input member, an output member, and at least one modulating clutch assembly selectively coupling the input member to the output member. The modulating clutch assembly includes an electrical clutch operator and clutch plates. The clutch plates include at least one first clutch plate coupled to the input member and at least one second clutch plate coupled to the output member. The second clutch plate is disposed adjacent the first clutch plate. The memory chip is integrated with the coupling device and is configured to store data related to a measured characteristic of the coupling device. The memory chip is also configured to communicate with a vehicle controller. A method of providing a calibration curve of the coupling device to the vehicle controller is also disclosed.

14 Claims, 4 Drawing Sheets

(51) Int. Cl.
  *F16D 48/06* (2006.01)
  *F16D 27/02* (2006.01)
  *G01M 13/02* (2006.01)
  *F16D 27/115* (2006.01)
  *F16D 27/14* (2006.01)
  *B60W 10/10* (2012.01)

(52) U.S. Cl.
  CPC ........ *B60W 2710/027* (2013.01); *F16D 27/004* (2013.01); *F16D 2300/18* (2013.01); *F16D 2300/26* (2013.01); *F16D 2500/50248* (2013.01); *F16D 2500/5116* (2013.01); *F16D 2500/702* (2013.01); *F16D 2500/70223* (2013.01)

(56) References Cited

U.S. PATENT DOCUMENTS

| | | | |
|---|---|---|---|
| 6,427,817 B1 | 8/2002 | Arai et al. | |
| 6,497,301 B2 | 12/2002 | Iida et al. | |
| 6,905,008 B2 | 6/2005 | Kowalsky et al. | |
| 7,144,350 B2* | 12/2006 | Maxon et al. | 477/107 |
| 7,147,094 B2* | 12/2006 | Wakao et al. | 192/84.1 |
| 7,379,807 B2* | 5/2008 | Remmlinger | 701/51 |
| 2001/0046923 A1* | 11/2001 | Reuschel et al. | 477/44 |
| 2002/0166409 A1* | 11/2002 | True et al. | 74/606 |
| 2004/0064232 A1* | 4/2004 | Eich et al. | 701/68 |
| 2004/0113488 A1* | 6/2004 | Sekihara | 303/119.3 |
| 2005/0034950 A1* | 2/2005 | Kowalsky et al. | 192/35 |
| 2006/0009328 A1* | 1/2006 | Jung et al. | 477/176 |
| 2006/0055552 A1* | 3/2006 | Chung et al. | 340/686.1 |
| 2006/0293145 A1* | 12/2006 | Lanker | 477/34 |
| 2009/0018683 A1* | 1/2009 | Gibbs et al. | 700/94 |

OTHER PUBLICATIONS

PCT/US2009/042822 International Search Report and Written Opinion; Mailed: Dec. 28, 2009; 12 pages.

* cited by examiner

INTEGRATED MEMORY CHIP FOR A COUPLING DEVICE

CROSS-REFERENCE TO RELATED APPLICATIONS

This application is a non-provisional (continuation) application which claims the benefit of PCT Application Ser. No. US09/42822 filed May 5, 2009, and which also claims the benefit of U.S. Provisional Application Ser. No. 61/052,843 filed May 13, 2008.

FIELD OF THE INVENTION

The field generally relates to clutch assemblies. More specifically, the invention relates to electrically actuated clutch assemblies.

BACKGROUND

Clutches which are activated or energized by electromagnetic coils are common components in rotary power transmission systems, both in stationary applications and in motor vehicles. Such electromagnetic clutches may be broadly characterized by whether they provide on-off energy transfer or modulating energy transfer. In the case of the former, dog clutches which may include auxiliary synchronizing devices are utilized whereas in the latter, friction clutch packs having a plurality of interleaved friction plates or discs are utilized. In either case, an electromagnetic operator which translates or compresses components of the clutch upon energization activates the clutch and upon deenergization deactivates or relaxes the clutch.

One type of torque transfer devices of the electrically actuated clutch type proportionally transfer torque from an input shaft to an output shaft based on the amount of current applied to an electrical actuator (applied as a constant current level based on applied voltage, or at an average level through pulse width modulation of applied voltage or some other modulation scheme). Each design requires the application of a certain amount of current to the electrical actuator to cause the clutch to transfer a given value of torque.

There is a constant drive toward reducing electric current consumption of motor vehicle components, in order to increase gas mileage, among other advantages of such a reduction. Inter-active torque management systems have provided closed loop torque feedback systems that measure the amount of torque being applied, in order to determine the minimum amount of torque required. Applying the minimum amount of torque required helps reduce electric current consumption and also may reduce wear on components. Likewise, there is also a need to provide accurate torque transfer in order to affect vehicle dynamics in prescribed fashion that promotes increased vehicle stability. In order to provide this functionality one must know the amount of torque transferred to the wheels during this maneuver, hence the need for torque feedback.

Some torque transfer devices include an electrical clutch operator having a solenoid coil. A solenoid coil is a coil of wire that provides a magnetic force when a current is passed through it. A solenoid can create controlled magnetic fields, and therefore, solenoids are often used as electromagnets to generate linear forces. Accordingly, a solenoid includes a fixed stator and a moving armature. Solenoids can be used in a variety of applications, such as in actively controlled couplings and differentials. In these types of applications, it is common to apply a known input to the solenoid to receive a predictable output force. However, one factor that affects the force output of a solenoid is the air gap present between the stator and the armature. For a solenoid used in an all-wheel drive (AWD) coupling, it has been difficult to measure or monitor the air gap directly. Therefore, is difficult to predict the input required to obtain desired outputs.

Due to manufacturing and component variations between units of a given design, the actual current required to produce certain torque transfer will vary. In other words, for a given current, the amount of torque each unit will transfer is often different. Thus, typically, the exact calibration curve of the coupling device is unknown; in other words, the exact amount of current input required to achieve a desired torque output is not exactly known. Therefore, it must be estimated, and various means have been used to do so. Still, there remains a need for a vehicle controller to be able to more accurately determine the amount of current required to achieve a given torque output.

A powertrain control unit (PCU) may be configured to apply current to engage the electrical actuator when desired. One example transfers torque from a front wheel drive transaxle to a rear axle of a motor vehicle. Since the amount of current required to transfer each of a range of desired torques will vary, existing PCUs are programmed to use average values. This results in inconsistencies between vehicles when engaging the torque transfer device. As a result, too much or too little torque may be transferred, which can lead to hard or soft engagement of, for example, the rear axle.

SUMMARY OF ILLUSTRATIVE EMBODIMENTS

One embodiment includes a coupling device system for use in a motor vehicle is provided including a coupling device and a memory chip. The coupling device includes an input member, at least one output member, and at least one modulating clutch assembly selectively coupling the input member to the output member. The modulating clutch assembly includes an electrical clutch operator and a group of clutch plates. The group of clutch plates includes one or more first clutch plates coupled to the input member and one or more second clutch plate coupled to the output member and disposed adjacent to the first clutch plate(s). The memory chip is integrated with the coupling device and is configured to store data related to at least one measured characteristic of the coupling device. The memory chip is also configured to communicate with a vehicle controller.

Another embodiment includes a method of providing a calibration curve of a coupling device having an electrical clutch operator including a solenoid assembly to a vehicle controller is provided. The method includes steps of measuring at least one characteristic of the coupling device, resulting in characteristic data, writing the characteristic data to a memory chip, the memory chip being in communication with a vehicle controller and integrated with the coupling device, and communicating the characteristic data from the memory chip to the vehicle controller.

DETAILED DESCRIPTION OF ILLUSTRATIVE EMBODIMENTS

Figure 1:
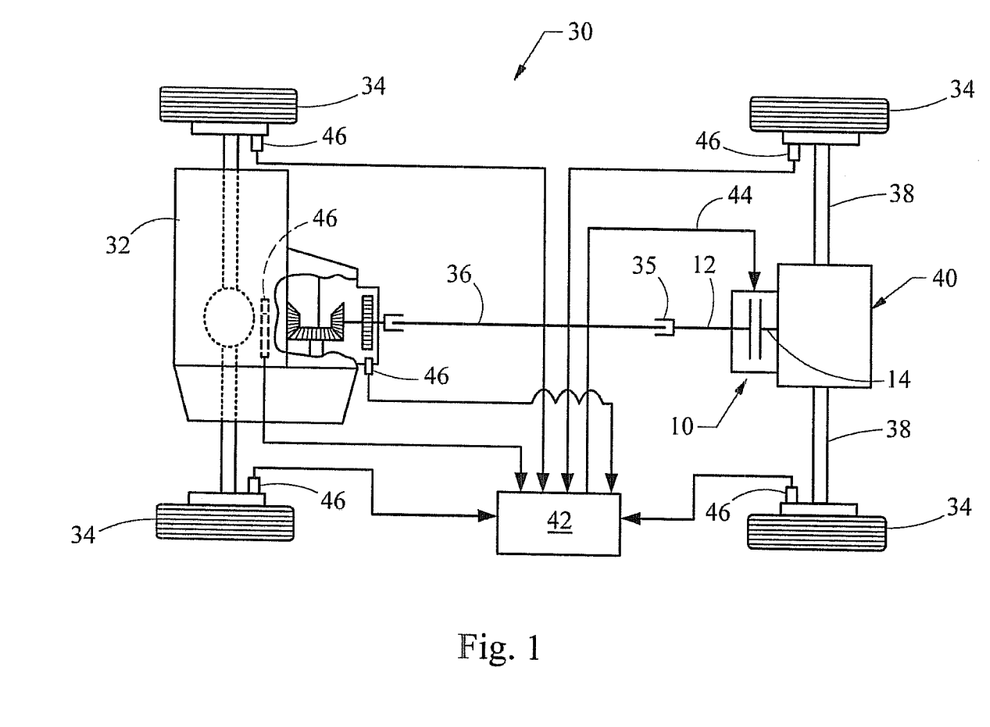
FIG. 1 is a schematic of a motor vehicle incorporating a coupling device system according to the present invention.

Referring now to the schematic of FIG. 1, a coupling device system including a coupling device 10 according to the present invention is shown incorporated into a motor vehicle 30. The motor vehicle 30 includes a motive source 32 such as an internal combustion engine or electric motor. A plurality of wheels 34 are coupled to the motive source 32 through a drive member 36 and output members 38. Two output members 38 are shown coupled to the drive member 36 using any embodiment of the coupling device 10. In this example, a differential 40 couples the two output members 38 to the output shaft 14 of the device 10.

A digital powertrain control unit (PCU) 42 is attached to the electrical clutch operator 54 of the coupling device 10 through, for example, a cable 44. The PCU 42 is configured to provide a range of electrical currents to the electrical clutch operator 54 based on a desired amount of torque to be transferred from the drive member 36 to the output members 38. The desired amount of torque may be determined by the PCU 42 by reading a plurality of sensors 46 providing information regarding the operational state of the motor vehicle 30. It should be recognized that the level of current applied to the electrical clutch operator may be applied as a constant current level based on applied DC voltage, or at an average level through pulse width modulation of applied voltage or some other modulation scheme. This embodiment may further be used with any approach used in which it is useful to relate an applied signal (whether as a DC, pulsed, or otherwise modulated signal applied as a current, voltage, or coded signal) to a desired value of modulated torque transfer through the coupling device 10. Moreover, a desired level of applied current (DC or pulsed in some way) may be produced through a feedback supply within PCU in which an applied voltage is adjusted in accordance with resulting monitored current flow.

Figure 2:
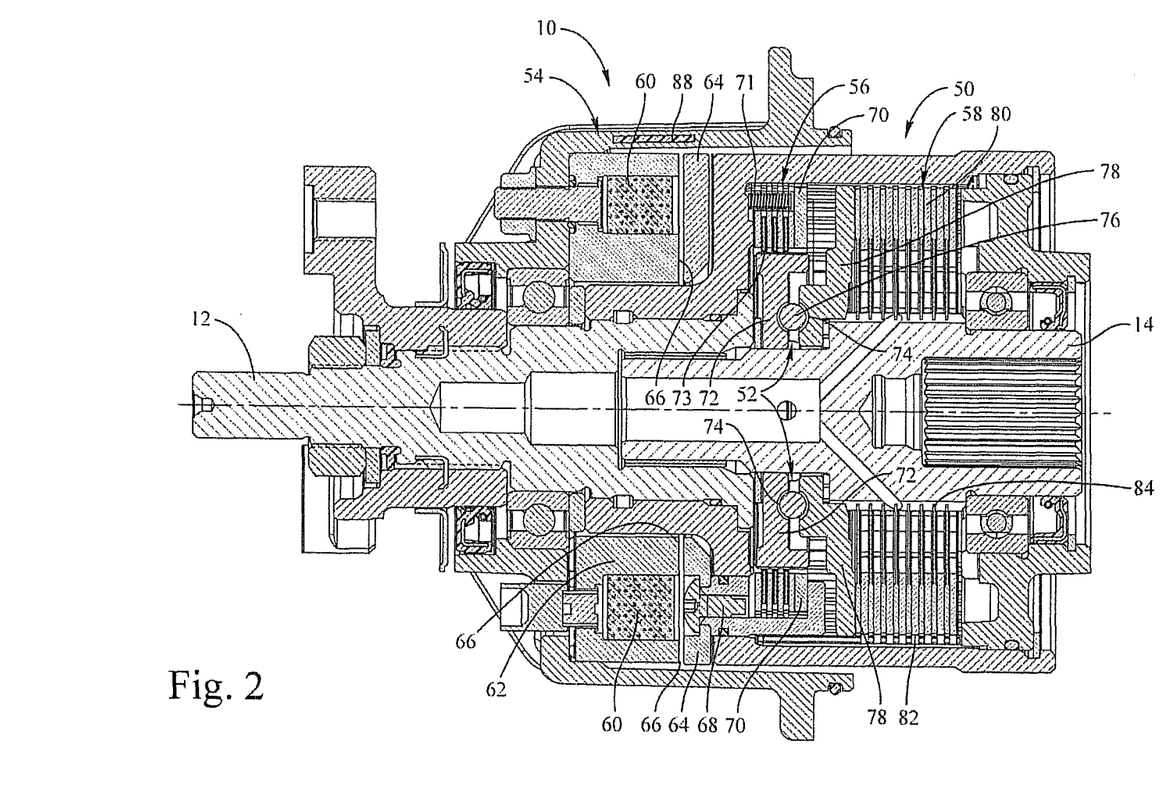
FIG. 2 is a cross-sectional view of a coupling device system according to the principles of the present invention.

Referring now to FIG. 2, a section view of the coupling device 10 of the present invention is illustrated in more detail. As its primary components, the coupling device 10 includes an input member 12 selectively coupled to an output member 14 by a modulating clutch assembly 50 having a ball ramp operator 52. The input member 12 may be disposed in a substantially coaxial relationship to the output member 14, as shown in FIG. 2, or the input and output members 12, 14, may have be disposed in another relationship, such as a substantially perpendicular relationship. One example of a coupling device having one or more modulating clutch assemblies and including a ball ramp operator is disclosed in U.S. Pat. No. 6,905,008 to Kowalsky. Another example is disclosed in U.S. Pat. No. 5,839,328 to Showalter.

The modulating clutch assembly 50 selectively transfers torque from the input member 12 to the output member 14 by activating an electrical clutch operator 54 of the modulating clutch assembly 50. The electrical clutch operator 54 may be operable to engage a pilot clutch pack 56, as described below, or the pilot clutch pack 56 may be omitted, and the electrical clutch operator 50 may engage a main clutch pack 58 in any other suitable way.

The electrical clutch operator 54 may comprise a solenoid coil 60, which may be energized to urge an annular solenoid plunger 62 toward the left as illustrated in FIG. 2. As the solenoid plunger 62 moves to the left, the air gap between the frusto-conical surfaces 64, 66 closes and the solenoid plunger 62 moves studs 68 to the left. The studs 68 are attached to a pressure plate 70, such that that when the studs 68 move to the left by virtue of the solenoid plunger 62 moving to the left, the pressure plate 70 moves to the left to compress the pilot clutch pack 56. The pilot clutch pack 56 has a first plurality of clutch plates 71 coupled to the input member 12 and a second plurality of clutch plates 73 coupled to a clutch hub 72. The armature 64 may be annular, as shown in cross-section in FIG. 2, or the armature 64 may be linear, or it may have any other suitable shape.

Upon being compressed, the pilot clutch pack 56 engages the ball ramp operator 52 to transfer torque between the input and output members 12, 14 through the pilot and main clutches 56, 58. More particularly, the clutch hub 72 is freely rotatably disposed upon the output member 14. A plurality of ramped recesses 74 is disposed in a circular pattern about the axis of the output member 14. Disposed within the recesses 74 are load transferring members, such as ball bearings 76 or similar components, which roll along the ramps defined by the recesses 74. An annular member 78 is disposed in opposed relation with the clutch hub 72 and includes a like plurality of complimentary sized recesses 74. Upon compression of the pilot clutch pack 56, the clutch hub 72 is pulled away from the annular member 78, causing the ball bearings 76 to ride up the recesses 74. As the ball bearings 76 ride up the recesses 74, the clutch hub 72 and the annular member 78 are driven apart. When the annular member 78 is driven away from the clutch hub 72, the annular member 78 acts as an apply plate to compress the main clutch pack 58.

Upon compression, the main clutch pack 58 transfers torque to the output member 14. More specifically, the main clutch pack 58 comprises a plurality of interleaved clutch plates 80. A first plurality 82 of the clutch plates 80 is coupled to the input member 12, either by being directly coupled or selectively coupled, for example by virtue of the pilot clutch pack 56 described above. A second plurality 84 of clutch plates 80 is coupled to the output member 14. When compressed, the first and second pluralities 82, 84 of clutch plates 80 rotate together, and main clutch pack 58 thereby couples the input member 12 to the output member 14. In some embodiments, the interleaved clutch plates 80 could include merely one first clutch plate 82 and one second clutch plate 84, without falling beyond the spirit and scope of the present invention.

The coupling 10 could have many other appropriate configurations not necessarily including a ball ramp operator and primary and secondary clutch packs. Other examples include, but are not limited to, electromechanical devices and electrohydraulic devices. For example, the clutch assembly 50 could be a single stage clutch with the force applied by a cylinder piston arrangement. The coupling 10 may include any appropriate electric motor configured to mechanically compress the clutch plates 80. An electrohydraulic device may include an electric pump and/or an electrically actuated valve to hydraulically compress the clutch plates 80.

Further the solenoid coil 60, coil housing 62, and armature 64 may have other appropriate configurations without falling beyond the spirit and scope of the present invention. For example, the housing 62 and armature 64 could have frusto-conical surfaces, such as those disclosed in U.S. Pat. No. 6,905,008 to Kowalsky et al.

When supplied with an electric current, the solenoid coil 60 produces a magnetic field, the strength of which is referred to as the magnetic flux $\phi$. When an N-turn coil carrying a current i is wound around a magnetic core, the magnetomotive force (mmf) F generated by the coil produces a flux $\phi$ that is mostly concentrated within the core and is assumed to be uniform across the cross-section of the core.

When a magnetic flux ϕ is produced, a magnetic force F acts upon the armature 64 to attract the armature 64 toward the coil housing 62 and close the air gap x between the armature 64 and the coil housing 62. When the armature 64 moves toward the coil housing 62, the modulating clutch assembly 50 is activated to selectively transfer torque from the input member 12 to the output member 14, as described above.

In modern coupling device systems, it is desirable to determine the current input required to generate a certain torque output. Thus, a calibration curve is obtained, usually at a test stand at the end of a coupling device production manufacturing assembly line. Typically, the calibration curve involves measuring the torque being output by the coupling device 10 as a function of the current being input to the solenoid coil 60. In other embodiments, the current could be input to a component other than a solenoid coil 60, without falling beyond the spirit and scope of the present invention.

The coupling device 10 includes a memory chip 88 integrated with the coupling device 10 and configured to gather and/or store data related to at least one measured characteristic of the particular coupling device 10. In the present embodiment, the memory chip 88 may be written with the calibration curve data, including data points for torque output as a function of current being input to the solenoid 60. Such data points may be measured at a test stand, such as an end-of-line test stand, and written to the memory chip 88. The memory chip is configured to communicate such data with a vehicle controller, such as the PCU 42.

Any desirable data of the coupling device 10 may be measured at the test stand, for example, the current may be measured with a current probe and the torque output may be measured with a force sensor, by way of example. Other parameters of interest could also be measured and written to the memory chip 88, such as temperature, air gap, and resistance; any electrical signal could be communicated to and stored on the memory chip 88. The data could be collected by the test stand and written to the memory chip 88 through a pin-out from the test stand to the memory chip 88, by way of example. Later, the memory chip 88 could be connected to a pin-out of the vehicle controller, which is described in further detail below.

The memory chip 88 is preferably a flash memory, such as the Catalyst CAT93C66SA. Other suitable memory chips includes, by way of example and not limitation, the Atmel—AT24C04B, the Atmel—AT25040A, the NXP—PCA24S08, and the ST Micro—M95256.

During or after assembly of the vehicle, the unique torque profile, or calibration curve, for the particular unit of the coupling device 10 being installed in the vehicle 30, which is stored on the memory chip 88, is communicated to and stored within the memory of the vehicle controller. The vehicle controller could have a pin-out to connect to the memory chip 88 and could use the data stored on the memory chip 88 to write the torque/current data (or any other data contained on the memory chip 88) to EEPROM in the controller, for example. This forms a matched pair resulting in more consistent and improved engagement of the coupling device 10 by the PCU 42 (or other vehicle controller).

The memory chip 88 could be configured to provide data to the vehicle controller (such as PCU 42) periodically, according to a predetermined time interval. In this way, the vehicle controller would be able to match the calibration curve of the coupling device 10 at periodic intervals. Thus, if either or both of the controller or the coupling device 10 were swapped out of a particular vehicle, the calibration curve written into the memory chip 88 would soon be read by the controller. In other words, if a new coupling device 10 was installed into a vehicle, the software logic of the controller could be written such that controller would be able to read the memory chip 88 on the new coupling device 10 to obtain the new calibration curve. In the alternative, if a new vehicle controller was installed into a vehicle, the software logic of the new controller could be written such that new controller would be able to read the calibration curve from the existing coupling device 10 through the memory chip 88.

In some forms of the present invention, the memory chip 88 may be configured to provide data to the vehicle controller when prompted by the vehicle controller. In other words, instead of, or in addition to, reading the memory chip 88 periodically, the controller could be configured to read the memory chip 88 when desired. For example, the memory chip 88 might be read when either or both of the coupling device 10 or the vehicle controller is replaced within a vehicle, or after another triggering event.

The memory chip 88 is integrated with the coupling device 10 such that the memory chip 88 has characteristic data written to it that corresponds to the particular coupling device 10 with which it is integrated. In other words, the memory chip 88 preferably contains characteristic data related to the exact coupling device 10 with which it is integrated. Such integration eliminates service concerns for matched controllers and coupling devices 10, and the coupling device 10 and controller do not need to be matched through the life of the vehicle because a calibration curve of a new coupling device system can be read by the controller or a new controller can read an existing calibration curve directly from the memory chip 88.

Thus, it is preferable that the memory chip 88 remain with the particular coupling device 10 whose data it contains. To this end, the memory chip 88 could be mounted on-board the coupling device 10, as shown in FIG. 2. It should be understood that the memory chip 88 could be attached at any location on the coupling device 10, without falling beyond the spirit and scope of the present invention. The on-board memory chip 88 is installed in communication with the vehicle controller, and the vehicle controller in turn is installed in communication with the solenoid coil 60 and controls the electrical signals being transmitted thereto based in part on the calibration curve received from the memory chip 88.

Figure 3:
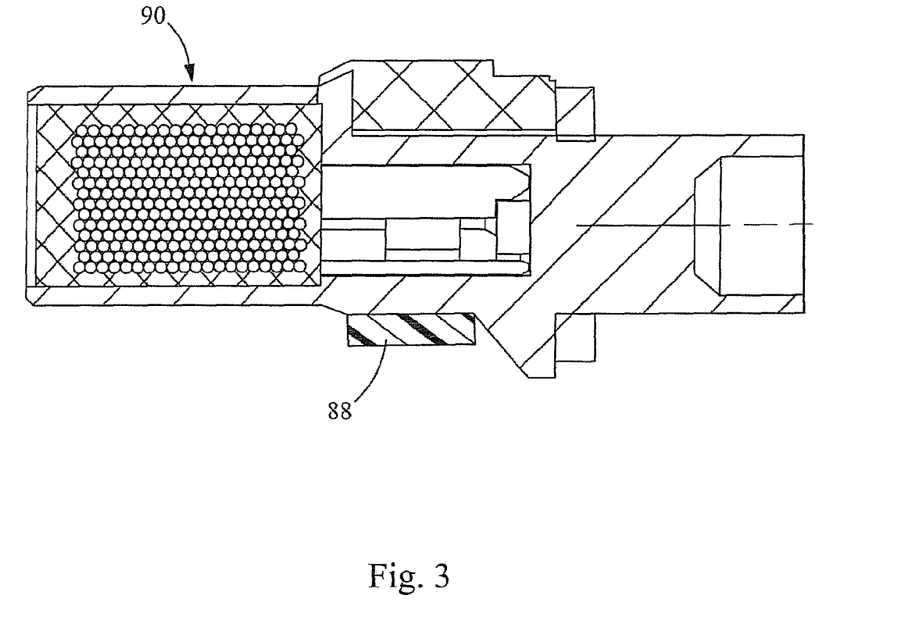
FIG. 3 is a schematic cross-sectional view of a coil connector, in accordance with the principles of the present invention.

In the alternative, with reference to FIG. 3, the memory chip 88 could be attached to a coil connector 90, which may be attached to the solenoid coil 60 of the electrical clutch operator 54 of the coupling device 10. The coil connector 90 may be attached to the solenoid coil 60 in any suitable manner, such as those known to persons having ordinary skill in the art. Similarly to an on-board memory chip 88 that is mounted to the coupling device 10, a memory chip 88 that is attached to the coil connector 90 is installed in communication with the vehicle controller, and the vehicle controller in turn is installed in communication with the solenoid coil 60. In other variations, the integrated memory chip 88 could be attached to any other suitable system component.

In some forms, the memory chip 88 could be removably attached to the coupling device 10, the coil connector 90, or another system component, to allow for repair or replacement of the memory chip 88, for example.

Other instances of the electrical clutch operator 54 may have other appropriate configurations instead of including a solenoid coil 60 and a pilot clutch pack 56. Other examples include, but are not limited to, electromechanical devices and electrohydraulic devices. The coupling device 10 may include any appropriate electric motor configured to mechanically compress the interleaved clutch plates 80, without falling beyond the spirit and scope of the present invention. An electrohydraulic device may include an electric pump and/or an electrically actuated valve to hydraulically compress the interleaved clutch plates 80.

Figure 4:
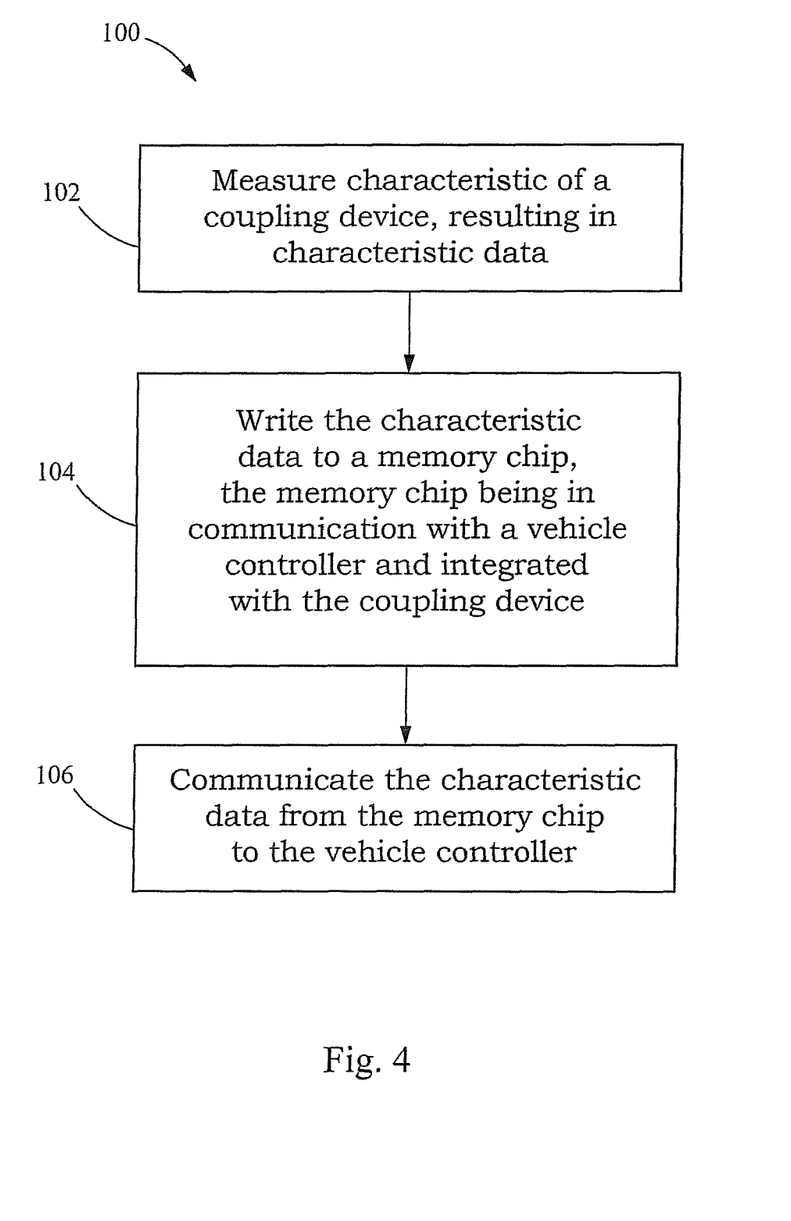
FIG. 4 is a block diagram of a method of providing a calibration curve of a coupling device to a vehicle controller, according to the principles of the present invention.

Now referring to FIG. 4, a method 100 of providing a calibration curve of a coupling device having an electrical clutch operator including a solenoid assembly to a vehicle controller is shown as a block diagram. The method 100 according to the present invention includes a step 102 of measuring at least one characteristic of the coupling device, resulting in characteristic data. Typically, a plurality of characteristics will be measured. For example, the step 102 may include measuring values of torque output of the coupling device and values of current being drawn by the solenoid coil of the coupling device, wherein each value of torque corresponds to a value of current. Such characteristic data results in a torque-current calibration curve.

The method 100 further includes a step 104 of writing the characteristic data to a memory chip, the memory chip being in communication with a vehicle controller and integrated with the coupling device. Another step 106 of the method 100 includes communicating the characteristic data from the memory chip to the vehicle controller.

The method 100 could then include installing the coupling device, the memory chip, and the vehicle controller into a motor vehicle. The coupling device could be of the type hereinbefore described, such as a coupling device 10 including an input member 12, at least one output member 14, and at least one modulating clutch assembly 50 selectively coupling the input member 12 to the at least one output member 14, wherein the modulating clutch assembly 50 includes an electrical clutch operator 54 and a plurality of clutch plates 80 having a first plurality 82 of clutch plates 80 coupled to the input member 12, and a second plurality 84 of clutch plates 80 coupled to the at least one output member 14 and interleaved with the first plurality 82 of clutch plates 80. Further, the coupling device 10 may be part of an all-wheel-drive coupling system.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

What is claimed is:

1. A coupling device system for use in a motor vehicle, the coupling device system comprising:
    a coupling device comprising:
        an input member and at least one output member;
        at least one modulating clutch assembly selectively coupling the input member to the at least one output member, the modulating clutch assembly including an electrical clutch operator and a plurality of clutch plates, the plurality of clutch plates having at least one first clutch plate coupled to the input member, and at least one second clutch plate coupled to the at least one output member and disposed adjacent to the at least one first clutch plate;
    a memory chip integrated with the coupling device and configured to store data related to at least one measured characteristic of the coupling device, the memory chip being configured to communicate with a vehicle controller.wherein the memory chip is configured to store data measured before the coupling device is installed on a vehicle and wherein the stored data creates a unique calibration curve being a function of torque versus current of the particular coupling device; and
        wherein the memory chip is configured to provide and store the unique calibration curve to the vehicle controller periodically, according to predetermined time intervals.

2. The coupling device system of claim 1, wherein the memory chip is configured to provide data to the vehicle controller when prompted by the vehicle controller.

3. The coupling device system of claim 1, wherein the memory chip is attached to the coupling device.

4. The coupling device system of claim 1, wherein the memory chip is mounted to the coupling device.

5. The coupling device system of claim 1, further comprising a coil connector attached to the electrical clutch operator, the memory chip being attached to the coil connector.

6. The coupling device system of claim 1, wherein the memory chip is removably attached to the coupling device.

7. The coupling device system of claim 1, wherein the electrical clutch operator comprises a solenoid coil.

8. The coupling device system of claim 7, where in the at least one first clutch plate is a plurality of first clutch plates and the at least one second clutch plate is a plurality of second clutch plates, the first and second pluralities of clutch plates being interleaved.

9. The coupling device system of claim 8, wherein the coupling device further comprises:
    a pilot clutch pack having a first plurality of pilot clutch plates coupled to the input member and a second plurality of pilot clutch plates coupled to a clutch hub, the second plurality of pilot clutch plates being interleaved with the first plurality of pilot clutch plates; and
    a pressure plate adjacent to the pilot clutch pack,
        wherein energization of the solenoid coil translates a solenoid plunger, causing the pressure plate to compress the pilot clutch pack.

10. The coupling device system of claim 9, wherein compression of the pilot clutch pack engages a ball ramp operator to compress the clutch plates of a main clutch pack of the modulating clutch assembly.

11. A method of providing a calibration curve of a coupling device having an electrical clutch operator including a solenoid assembly to a vehicle controller, the method comprising:
    providing a test stand to measure a torque output and a current being input to a solenoid coil of the coupling device;
    measuring the torque output and the current being input to the solenoid coil of the coupling device with the test stand, resulting in a torque versus current curve;
    writing the torque versus current curve to a memory chip, the memory chip being in communication with a vehicle controller and integrated with the coupling device;
    communicating the torque versus current curve from the memory chip to the vehicle controller periodically, according to predetermined time intervals;
    wherein the torque output and the current being input to the solenoid coil are measured before the coupling device is installed in a vehicle and the torque versus current curve is uniquely created for the specific coupling device being measured; and
    controlling the coupling device via the vehicle controller based on the torque versus current curve.

12. The method of claim 11, further comprising installing the coupling device, the memory chip, and the vehicle controller into a motor vehicle.

13. The method of claim 11, wherein the coupling device includes an input member, at least one output member, and at least one modulating clutch assembly selectively coupling the input member to the at least one output member, the modulating clutch assembly including the electrical clutch operator and a plurality of clutch plates having a first plurality of clutch plates coupled to the input member, the modulating clutch assemble including the electrical clutch operator and a plurality of clutch plates having a first plurality of clutch plates coupled to the input member, and a second plurality of the clutch plates coupled to the at least one output member and interleaved with the first plurality of clutch plates.

14. The method of claim 13, wherein the coupling device is part of an all-wheel-drive coupling system.

\* \* \* \* \*